No. 716,703. Patented Dec. 23, 1902.
L. GATHMANN.
WATER PURIFYING APPARATUS.
(Application filed Aug. 13, 1900.)
(No Model.) 2 Sheets—Sheet 1.

Witnesses
F. H. Schott
Anton A. Gloetzner

Inventor
Louis Gathmann

No. 716,703. Patented Dec. 23, 1902.
L. GATHMANN.
WATER PURIFYING APPARATUS.
(Application filed Aug. 13, 1900.)
(No Model.) 2 Sheets—Sheet 2.
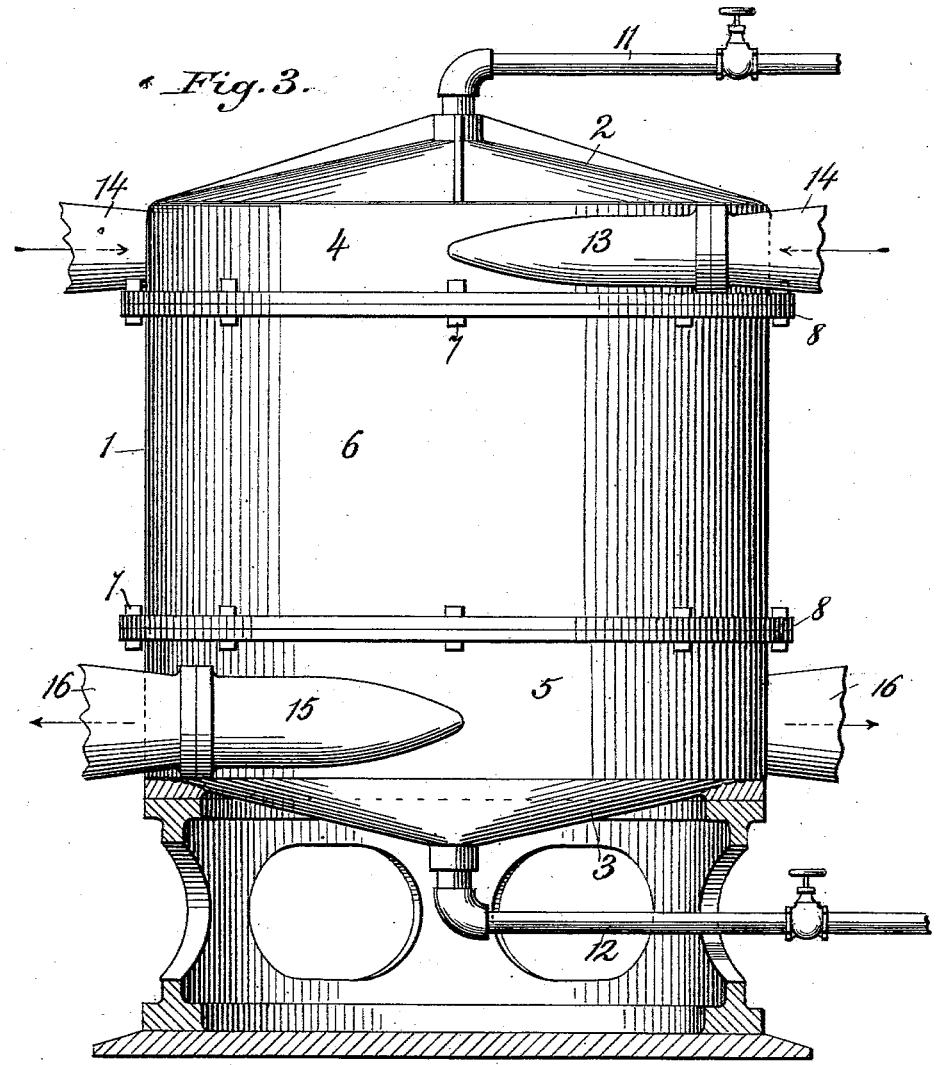
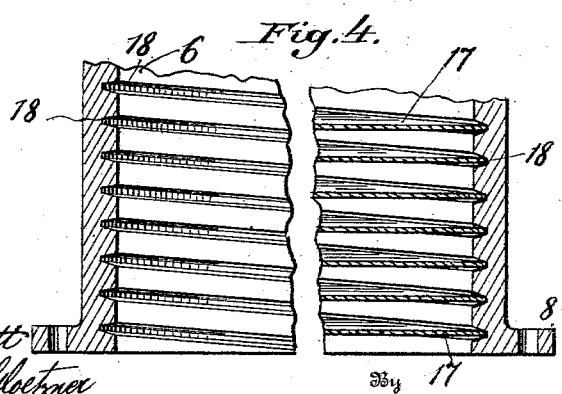

UNITED STATES PATENT OFFICE.

LOUIS GATHMANN, OF WASHINGTON, DISTRICT OF COLUMBIA.

WATER-PURIFYING APPARATUS.

SPECIFICATION forming part of Letters Patent No. 716,703, dated December 23, 1902.

Application filed August 13, 1900. Serial No. 26,770. (No model.)

*To all whom it may concern:*

Be it known that I, LOUIS GATHMANN, of Washington, in the District of Columbia, have invented certain new and useful Improvements in Water-Purifying Apparatus, of which the following is a specification.

This invention relates to apparatus for purifying water, and refers more particularly to an apparatus embodying improvements upon the apparatus set forth in an application filed by me September 16, 1899, Serial No. 730,723.

The object of the present invention is to provide a structure which is simple, compact, and inexpensive and which will impart to the water passed therethrough a more perfect vortical action, thereby increasing the efficiency of the apparatus in its purifying functions, and in which also the principal body of purified water is deflected abruptly out of its course prior to its discharge from the separator in such manner as to separate it from that portion or stratum of the stream which contains the bulk of the heavier impurities, this latter portion being withdrawn through a separate outlet.

To the above end the invention consists in the matters hereinafter described, and more particularly pointed out in the appended claims, and will be readily understood from the following description, reference being had to the accompanying drawings, in which—

Figure 1:
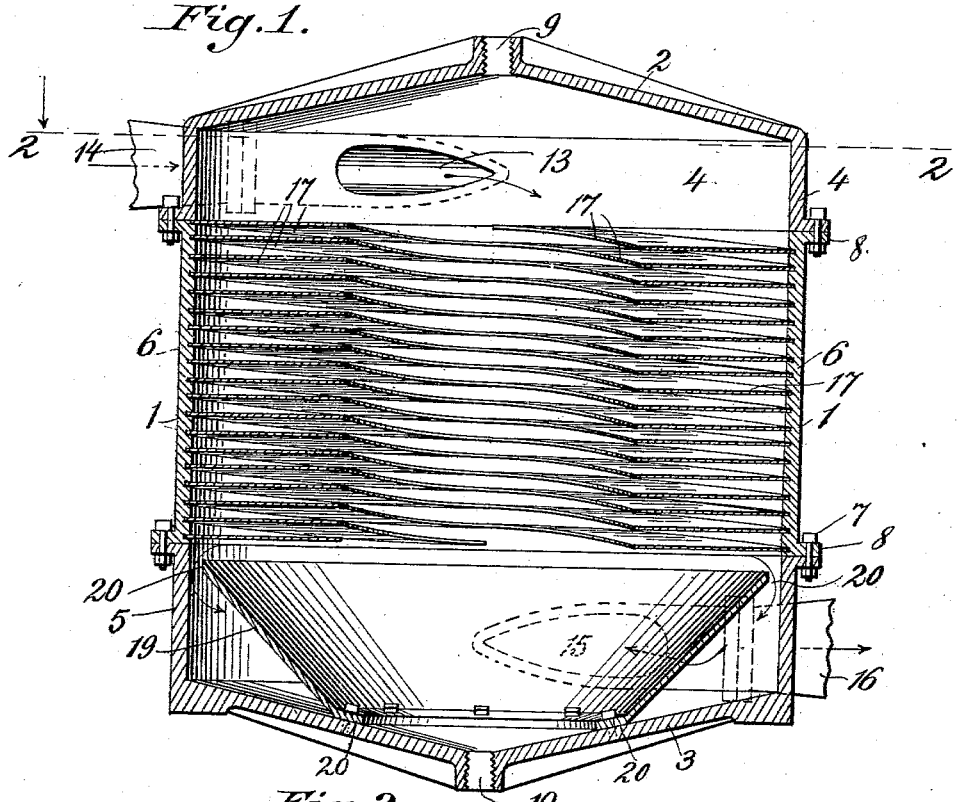
Figure 2:
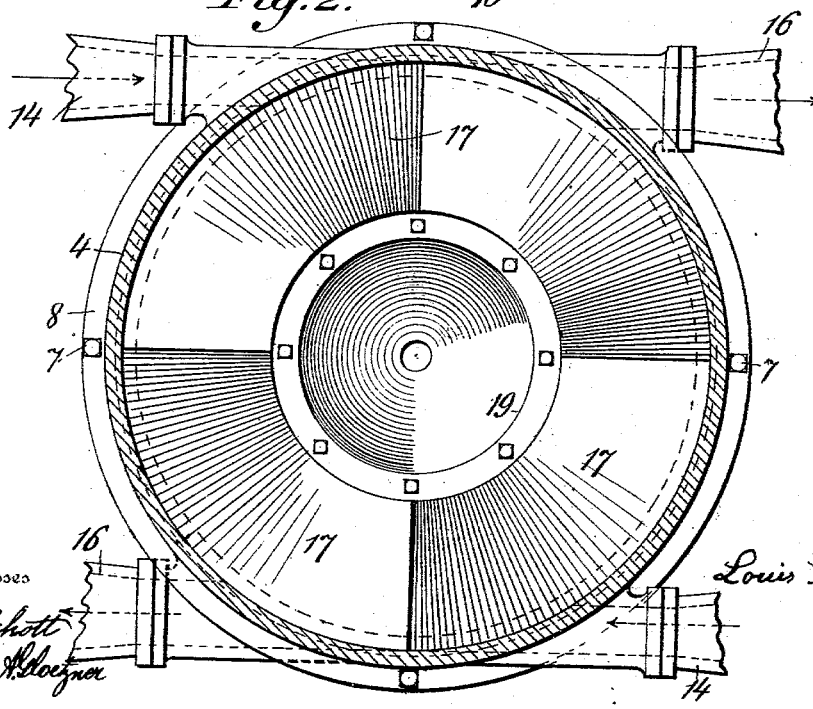

Figure 1 is an axial sectional view of a separator embodying the invention. Fig. 2 is a horizontal sectional view taken on the line 2 2 of Fig. 1 and looking downwardly. Fig. 3 is a side elevation of the separator, and Fig. 4 is a fragmentary sectional detail showing on an enlarged scale the construction of the internal threads of the separator and the manner in which the spirally-arranged guide flanges are seated therein.

In purifying water or analogous liquid in accordance with the present invention the water is passed into and through a closed chamber of such internal shape and construction that a rapid vortical motion is imparted to the body of water passing therethrough, this vortical action resulting in effecting a double purification—that is to say, the vortical action of the body of water causes those impurities which are of greater specific gravity than the water or liquid being purified to be carried inwardly and toward center of rotation and then down by gravity toward exit-main, while the lighter impurities or those of less specific gravity than the water are drawn toward the center of the vortex and by reason of their lesser gravity tend to rise. Secondary outlets or outlets of limited size are provided at each end of the separating-chamber, through which those portions of the body of water passing through the apparatus most heavily charged with the impurities are withdrawn, the lighter impurities passing out through the upper outlet and the heavier impurities through the lower.

The above general description applies equally to the apparatus set forth in said prior application hereinbefore referred to and to the apparatus constituting the present invention. In the invention described herein, however, I provide means for imparting a more certain and perfect vortical action to the body of water and provide also means whereby the main body of purified water is more effectually separated from the heavier impurities just prior to its escape from the purifying-receptacle.

Referring now to said drawings, 1 designates as a whole the separating-receptacle, consisting of a circular vessel desirably cylindric having its axis arranged vertically and preferably provided with outwardly-bulged or conical end walls 2 3, respectively. Said vessel may be constructed in any suitable or preferred manner, the construction illustrated herein consisting of two end sections 4 5 and an intermediate section 6, suitably united with each other, as by means of bolts 7, passed through meeting outturned flanges 8, the conical end walls 2 3 being formed integrally with the respective end sections and being each provided at its center with an outlet-aperture, as 9 10, internally threaded for connection with suitable eduction-pipes 11 and 12, respectively. The upper section 4 is provided also with an inlet aperture or port 13, with which is connected an inlet pipe or main 14, which is arranged to discharge through said inlet tangentially to the circular side wall of the vessel, so that the water entering therethrough under pressure acquires a vortical motion. The lower section 5 is likewise provided with a discharge-opening 15, with which is connected an eduction pipe or main 16, this latter main being also preferably, and as shown in the present instance, arranged to extend tangentially from the vessel, although, as will hereinafter appear, this particular arrangement of the pipe is not essential.

In order to accentuate the vortical action of the body of water in its passage through the separator and at the same time to provide increased friction-surface, which will aid in effecting a more thorough separation of the silt, sand, and heavier impurities from the water, I provide upon the interior of the circular side wall of the vessel spiral radially-disposed projections or flanges which form passages through which the principal part of the body of water passes in its course through the vessel and to the outlet thereof. In the preferred construction shown herein such projections or flanges are formed by means of a plurality of helical sheet-metal strips 17, each having its outer periphery seated in a corresponding helical groove or screw-thread 18, formed in the inner cylindric wall of the vessel. In the present instance four of such strips are interspaced at uniform intervals apart, each strip consisting of a sufficient number of turns or coils to extend from a point slightly below the main inlet-opening downwardly to a point somewhat above the main outlet-opening, in the particular instance illustrated throughout the axial length of the intermediate section 6. Said strips are preferably so shaped and disposed that they are horizontal with reference to radial lines extending from the axis of the vessel and are of a width considerably less than one-half the diameter of the interior of the vessel, so that there is provided a centrally-disposed unobstructed vertical passage in open communication with the spaces between the several guide-flanges.

In order that the descending body of water may be caused to make an abrupt return before it finally escapes through the eduction-main, I provide in the bottom of the vessel a basin-shaped or frusto-conical flange 19, the lower end of which is secured to the bottom wall of the vessel, as indicated at 20, and the upper edge of which is located a short distance from the side wall of the vessel and slightly below the lower ends of the guide-flanges 17, so as to provide an annular passage between said upper edge and the side wall, as indicated at 20, through which the water may escape from the interior of the basin-shaped receptacle thus formed over the edge the latter, and thence to the outlet 15.

The operation of the apparatus constructed as described will probably be entirely obvious from the foregoing description, but may be briefly recapitulated, as follows: Water entering through the main 14 under pressure fills the receptacle and by reason of the tangential direction in which it enters imparts to the body as a whole a whirling or vortical action. At the same time by reason of the fact that the outlet is located at the lower end of the receptacle the body of water descends, the principal portion thereof being compelled to follow the helical passages formed between the series of guide-flanges, thereby insuring that the liquid shall perform a large number of revolutions in passing through the vessel, and consequently imparting a strong vortical action to the liquid. This vortical action tends to concentrate the impurities in the center of the vortex, owing to the fact that this part of the liquid is moving most slowly and it being the zone of least pressure. The light impurities tend to rise and are drawn off through the upper eduction-pipe 11. The heavier impurities will descend, owing to greater specific gravity, and can be drawn off through the lower eduction-main 12. The helical projections greatly assist the movement of impurities toward center of rotation by offering more resistance thereto than to the water itself. On the impurity eduction-pipes 11 and 12 are suitable valves, with which the flow of water containing the impurities can be regulated, so that either a continuous flow can be maintained or the valves may be opened at intervals and a flush of water carry off the accumulated impurities which have gathered in vortex or center of apparatus. The principal part of the body of water descending through the separator passes into the basin-shaped receptacle and is then compelled to make an abrupt return over the edge of the latter in its passage to the main eduction-opening 15, and this abrupt return of the stream permits the heavier impurities, which are being discharged into the basin from the guide-flanges, to pass through the ascending liquid to the central part of the basin, whence they are discharged through the eduction-pipe 12.

It will of course be understood that I may use a plurality of such receptacles, through which the liquid is passed successively in case the liquid be heavily charged with impurities. It will be seen from the foregoing description that an apparatus constructed in accordance with my invention is simple and of cheap construction, containing no moving parts whatever, and it has proven in practice to be extremely effective in purifying the water from such impurities as are suspended therein.

It will be obvious that the details of construction may be modified without departing from the spirit of the invention, and I do not wish, therefore, to be limited to the precise details shown, except as they may be made the subject of specific claims.

I claim as my invention—

1. In a liquid-purifying apparatus, a vessel having a circular side wall; a liquid-inlet arranged to discharge into said vessel tangentially; a liquid-outlet located at the opposite end of said chamber in said side wall; and a helically-disposed plate or flange extending around the interior of said chamber adjacent to its side walls between the inlet and outlet openings, said plate affording a continuous passage of numerous convolutions and the axial portion of said chamber being open to said passage; and an axial outlet for the separated impurities, substantially as described.

2. In a liquid-purifying apparatus, a vessel having a circular side wall, an inlet arranged to discharge into said vessel tangentially to said circular side wall, an outlet located axially remote from the inlet and a helically-disposed flange extending around the interior of said circular side wall between the inlet and outlet openings, the upper surface of said flange substantially horizontal with reference to radii from the longitudinal axis of the chamber and the radial depth or width of said flange being less than one-half the diameter of the vessel whereby a central unobstructed passage through that part of the vessel between the inlet and outlet openings is provided.

3. In a liquid-purifying apparatus, the combination of a vessel having a circular side wall, an inlet-opening arranged to discharge tangentially to said side wall whereby a vortical action is imparted to the liquid within the vessel, a discharge-opening located at the end of the vessel remote from said inlet-opening, and a deflecting-flange located in the discharge end of the vessel, and arranged to deflect the main body of liquid abruptly upwardly on its passage to the discharge-outlet, substantially as described.

4. In a liquid-purifying apparatus, the combination of a cylindric vessel, provided adjacent to one end with an inlet arranged tangentially to its cylindric side, an outlet located adjacent to its opposite end, a centrally-disposed outlet in each of its end walls, and a frusto-conical deflecting-flange, arranged with its smaller end against the discharge end wall concentrically with the central discharge-outlet thereof, and with the periphery of its opposite end adjacent to but removed from the cylindric side wall of the vessel, whereby a restricted annular passage is provided between said periphery of the flange and side wall, as and for the purpose set forth.

5. In a liquid-purifying apparatus, the combination of a cylindric vessel, provided adjacent to one end with an inlet arranged tangentially to its cylindric side, an outlet located at or adjacent to its opposite end, a helically-arranged strip or flange arranged to extend around the interior of said chamber between the main outlet and inlet passages, having its outer edge seated in a correspondingly-shaped groove formed upon the interior of the vessel, a centrally-disposed outlet in each end of the end walls of said vessel, and a frusto-conical deflecting-flange, arranged with its smaller end against the discharge end wall concentrically with the central discharge-outlet thereof, and with the periphery of its opposite end located adjacent to but removed from the cylindric wall of the vessel, whereby a restricted annular passage is provided between said periphery and side wall, as and for the purpose set forth.

6. In a liquid-purifying apparatus, the combination of a cylindric vessel, provided adjacent to one end with an inlet arranged tangentially to its cylindric side, an outlet located at or adjacent to its opposite end, a plurality of helical strips interspaced and arranged to extend around the interior of the vessel between said main inlet and outlet openings, each having its outer edge seated in a correspondingly-shaped groove formed upon the interior of the vessel, a centrally-disposed outlet in each end of the end walls of said vessel, and a frusto-conical deflecting-flange, arranged with its smaller end against the discharge end wall concentrically with the central discharge-outlet thereof, and with the periphery of its opposite end located adjacent to but removed from the cylindric wall of the vessel, whereby a restricted annular passage is provided between said periphery and side wall, as and for the purpose set forth.

LOUIS GATHMANN.

Witnesses:
EMIL GATHMANN,
A. C. SPALDING.